(12) United States Patent
Dao et al.

(10) Patent No.: US 10,345,483 B2
(45) Date of Patent: Jul. 9, 2019

(54) OBSERVER-BASED METEOROLOGY AND IMAGE IDENTIFICATION

(71) Applicants: Tung X. Dao, San Jose, CA (US); Jeffrey M. Lewis, La Canada, CA (US)

(72) Inventors: Tung X. Dao, San Jose, CA (US); Jeffrey M. Lewis, La Canada, CA (US)

(73) Assignee: ESCAYPE, Campbell, CA (US)

( * ) Notice: Subject to any disclaimer, the term of this patent is extended or adjusted under 35 U.S.C. 154(b) by 197 days.

(21) Appl. No.: 15/158,494

(22) Filed: May 18, 2016

(65) Prior Publication Data

US 2016/0363696 A1    Dec. 15, 2016

Related U.S. Application Data

(60) Provisional application No. 62/173,926, filed on Jun. 10, 2015.

(51) Int. Cl.
*G01W 1/00* (2006.01)
*G06K 9/00* (2006.01)
*G01W 1/10* (2006.01)

(52) U.S. Cl.
CPC ............... *G01W 1/00* (2013.01); *G01W 1/10* (2013.01); *G06K 9/0063* (2013.01)

(58) Field of Classification Search
USPC ....................................................... 73/170.16
See application file for complete search history.

(56) References Cited

U.S. PATENT DOCUMENTS

2017/0109634 A1    4/2017   Kuhns

*Primary Examiner* — Andre J Allen
(74) *Attorney, Agent, or Firm* — Gavrilovich, Dodd & Lindsey LLP

(57) ABSTRACT

The disclosure is directed to providing an observer-based scenic and aesthetic meteorology/weather model and service. Examples of observers include but are not limited to: photographers, particularly those who desire to take sunset and sunrise landscape photographs, videographers, motion picture crews, outdoor goers, aviation crews, tour groups, and weather enthusiasts.

20 Claims, 11 Drawing Sheets

OBSERVER-BASED METEOROLOGY AND IMAGE IDENTIFICATION

CROSS REFERENCE TO RELATED APPLICATIONS

This application claims priority to U.S. Provisional Application No. 62/173,926, filed Jun. 10, 2015, the disclosure of which is incorporated herein by reference in its entirety.

FIELD OF THE INVENTION

The invention is directed to providing an observer-based scenic meteorology/weather model and service. Examples of observers include but are not limited to: photographers, particularly those who desire to take sunset and sunrise landscape photographs, videographers, motion picture crews, outdoor goers, aviation crews, tour groups, and weather enthusiasts.

BACKGROUND

Weather prediction and forecasting predicts the state of the atmosphere. Weather forecasting can, for example, include whether a certain area will have cloud cover at certain times of a day, and in some cases can additionally specify the heights and types of clouds, such as for aircraft navigational and route planning purposes. Atmospheric models can also optionally predict physical variables about the state of the atmosphere at a particular location and time, including the relative humidity, aerosol content, and other physical and chemical properties of the atmosphere. Such predications can also include daylight hours, the location of the sun and moon as well as the time of sunrise and sunset.

Personalized observer-based weather prediction services predict the state of the atmosphere, with respect to certain variables including cloud cover, humidity, and probability of precipitation, from the perspective and location of an observer. Systems and methods also exist for certain short-term and real-time forecasting using satellite and radar observations.

These weather predictions do not however predict, or attempt to describe, the colors, light refraction, reflection, transmission or absorption that provides certain aesthetic values associated with atmospheric characteristics. For example, weather prediction does not provide any information on lighting, a color palette, and texture in the sky arising from the interaction of natural or artificial lighting with the clouds, humidity, and other physical and chemical properties of the atmosphere. Weather prediction models furthermore do not predict the aesthetic properties of the atmosphere from a specific viewing location of an observer.

SUMMARY

The disclosure provides methods for describing, predicting, forecasting and rating the optical and/or aesthetic properties of the atmosphere from the perspective of an observer. The process of the disclosure provides an aesthetic meteorology, or scenic meteorology. Scenic meteorology quantitatively and qualitatively considers the factors that add lighting and image value to a scene and accounts for the ways in which these factors are perceived by an observer. These factors include, but are not limited to: cloud qualities such as the color, quality, cover, and texture of clouds, which may be, for example, at sunrise or sunset; optical phenomena such as rainbows, sundogs, moondogs, crepuscular rays, cloud shadows, sun pillars, and the effects of haze; and other lighting and physical parameters of the atmosphere as viewed by an observer.

The disclosure describes an algorithm-based model that quantitatively and qualitatively predicts and rates an atmospheric scene from the viewpoint of an observer. The model additionally describes the certain visual qualities of the predicted scene on one or more rating scales, with a plurality of rating scales being mutually complementary and optionally based on statistical analysis. One embodiment of the disclosure calculates the amount, quality, and height of the cloud cover over an observer, how the clouds are moving and changing with time, the probability that the clouds will dramatically light up in conjunction with a given sunrise or sunset event, and the best time and direction to view an event from the perspective of an observer. Other embodiments include quantitative and qualitative analysis of the image qualities of an event, as viewed by an observer, and the use of one or more rating scales to describe the event's qualities to the observer:
  cloud texture;
  sundogs or moondogs;
  sun pillars;
  crepuscular rays or anticrepuscular rays;
as well as other cloud qualities or optical phenomena that can be extracted from weather models or weather data.

One or more human or artificial-intelligent/computer-based forecasters then optionally interprets the algorithm output and juxtaposes it with one or more of the following: current weather data, observations, and real-time reports, to add further meaning and/or improve the accuracy and/or precision of the output, and/or communicate it most effectively to the observer network.

In another embodiment the method processes data from one or more regional or global weather models and/or satellites that provides information on the cloud height, temperature, aerosol concentrations, and/or other physical properties of the current and past state of the atmosphere in the vicinity of a scene/location of interest, as well as allows for the use of forecasting and prediction models to predict the physical properties of the atmosphere at a time in the future. Examples of such models include: NAM (North American Mesoscale Forecast System), GFS (Global Forecast System), ECMWF (European Center for Medium Range Weather Forecast), HRRR (High Resolution Rapid Refresh), and in-house forecasting prediction models. Examples of satellites include: GOES (Geostational Operational Environmental Satellite), MTSAT (Multi-functional Transport Satellite) and infrared, water vapor, or visible observations.

The location and altitude of the observer are then specified, along with the angle between the observer and the light sources at the time of interest for forecasting purposes at the specific location of interest. As described herein, this information, as well as the light's azimuth angle (cardinal angle of the light source), the light's elevation angle, and geopotential information, is then used in an algorithm to predict the presence, extent, movement, and optical properties of clouds visible to an observer at a certain time at the location and from the viewing perspective of the observer. This approach allows for a representation of the lighting of the scene, which is then used to rate the scene based on a rating scale. The rating scale may include one or more rating parameters that quantify the visual value of the predicted scene to an observer at the specific date/time of interest. A single variable rating scale can be used for this purpose. In a one embodiment, a dual rating scale is used, to provide further information to the observer. Such dual scales are well-known in the state-of-the-art for a variety of fields can be obtained using a variety of conventional statistical analysis tools.

If certain physical requirements are met in the predicted scene, the potential exists for certain cloud and/or optical phenomena to occur with respect to an observer. The model output allows the assessment of the potential of the conditions and thus provides a basis for the issuing of a forecast. The forecast is further enhanced when it is supported by real time observations and interpretation by one or more human and/or computer-based/artificial intelligence forecasters.

In one embodiment, the lighting of a sunset and/or sunrise are evaluated and computed for an observer. The virtual observer can be identified by longitudinal, latitudinal, and elevation data.

In another embodiment, cloud analysis is provided. In this embodiment, the method determines cloud visibility to a user, and then provides information on light effects on such clouds (e.g., catching colorful light while the sun is at specific angles). The method is performed by scanning through different angles, relative to both the horizon and the sun azimuth angle, with knowledge of the cloud height and other relevant variables, allows for the determination of the optimum viewing time, the specific colors that are visible in the sky, as well as the direction, intensity, and/or duration of the color.

An alternate method for this embodiment, which may be used independently or in conjunction with the foregoing, is to make use of a satellite image or to construct a virtual map of where the clouds are likely to be at a given event time. This process is then followed by a scan to determine which clouds will catch light when the sun or other natural or artificial illumination sources are at specific angles relative to an observer at a specified location. Calculations may involve the distance between the observer and the end of the cloud mass, the broadness of the open sky, and the height of the clouds (which can be determined from a satellite image and/or from model output), as well as the solar azimuth angle, among other relevant variables. The method allows for the determination of the optimum viewing time of the scene, the specific colors that are visible in the sky in the scene, as well as the direction, intensity, and/or duration of the color in the scene.

Another alternate method that may be used independently or in conjunction with the foregoing embodiments, is to determine the strength of reflected light at the location of an observer. Clouds that are lit from underneath will reflect light rays, and when this colorful light reaches an observer, the observer witnesses a colorful sunset or other colorful lit scene. The method may consider factors including properties of the clouds that affect the strength of this reflected light, include at least one of the following: haze, aerosol concentrations, smoke from nearby fires, atmospheric refraction, atmospheric scattering, atmospheric diffraction, reflection, absorption, emissivity, atmospheric diffusion, other clouds that "block" the light, or any other factor that otherwise obscures or attenuates the light rays prior to reaching the observer.

In alternate embodiments of the disclosure, optical phenomena are evaluated. For example, the presence of a rainbow visualized from the perspective of an observer can be determined when certain conditions are met; for example, a scan finds approximately a 42-degree reflected angle between the viewer, water droplet, and the natural or non-natural light source. The location of water droplets can be associated with rain cells, waterfalls, fog, and other suspended, rising, or falling water droplets. The position of water droplets from rain clouds, through which dispersion quantifiably occurs, can be forecasted by determining areas of precipitation and deep convection through the use of atmospheric models, and by tracking storm cell development and motion on radar imagery; fog can be forecasted by identifying ground-level clouds and moisture; other rainbow sources are identified by the latitude, longitude, and elevation data of waterfalls and other water droplet-producing features. In addition to rainbows, similar techniques can be used to determine the presence of sundogs or moondogs.

In another embodiment of the invention, the aesthetic qualities of cloud and geographic shadows, crepuscular rays, or anticrepuscular rays are evaluated. Clouds, mountains, and other features all cast shadows, which block the light from reaching certain clouds at a given sun angle, but they also create dramatic effects often referred to as "light beams" or "God rays". To determine the existence, strength, and direction of these shadow effects, openings in the cloud mass and/or variations in the cloud deck are identified. The qualities of the rays are determined from the size and shape of the cloudless area, or cloud casting a shadow, and from the distance of that feature from the viewer. These effects can also occur and be quantified in the transition zone between fog and clear sky, as well as waterfall spray.

For each location, the qualities of the predicted phenomenon with respect to a specific observer's location are reported using a rating scheme of one or more quantities. In the case of a plurality of ratings, the rating scales are mutually complementary and optionally are based on statistical analysis.

Another embodiment of the disclosure also includes a machine-learning component, by which one improves the predictive possibilities by looking at the past data for scenes and comparing it to the predictions of said scenes. Such data are input into a neural network and/or support vector machine, and formulated in the form and format of a training and then test data set. Said neural network is then used to classify a predicted atmospheric state in a numerical sense. A set of numbers is then assigned to the value of the predicted scene from the viewpoint/perspective of the observer.

In another embodiment of the disclosure, the illumination values of a sunset/sunrise are presented on an electronic computing device, using a rating scheme of one or more quantities. An example of a complementary rating scheme that uses a plurality of quantities comprises the use of three variables for formulation of the overall rating: potential, Chance of Skunk, and best time. The potential assesses the amount and quality of the cloud cover over an observer at a given event time. The "potential" does not describe whether the clouds will light up at the event time; e.g., a sky full of clouds that do not light up at event time is still given a 100% potential rating. The potential score may also consider the cloud direction, as clouds facing in the direction of sunrise/sunset are generally more desirable, as well as one or more of the following: cloud texture, uniformity and organization of cloud mass, thickness of cloud mass, and potential to exhibit atmospheric optics phenomena of interest. The Chance of Skunk assesses the likelihood of the clouds in the sky lighting up colorfully at the event time, determined by one or more of the following factors: the fraction of the clouds that are lit, the amount of time that the clouds are lit, the intensity of the light on the clouds that are lit, the possibility of areas of low clouds that would block an observer's view of a sunset, haze, and the direction in which the best light occurs. Unlike the potential score, the Chance of Skunk does not describe how many clouds or what kind of clouds will be present in the scene. For an example, a very small cloud that is expected to light up is still rated to have a 0% chance of skunk. The third rating parameter, the best time, assesses the duration of the colorful sunrise or sunset or other scene (also known as the "burn"). Burns that are closer to the sunrise or sunset time are typically yellow-orange, whereas burns that occur when the sun is further below the horizon are typically pink and red. The Chance of Skunk, potential score, and optionally other data, are then summarized and optionally uploaded to a server. The data can be accessed by users using computing devices, which can include mobile phones, tablets, or personal computer devices.

As an alternate embodiment, the qualities of a sunset/sunrise are presented on an electronic computing device using a rating scheme that assesses the positive predictive value (PPV) and negative predictive value (NPV) to determine the likelihood of a colorful sunset/sunrise at the observer's location.

As another alternate embodiment, the qualities of a sunset/sunrise are presented on an electronic computing device using a rating scheme in accordance with the receiver operating characteristic (ROC curve) that assesses the sensitivity and specificity to determine the likelihood of a colorful sunset; that is, the true positive and false positive rate.

As another alternate embodiment, the qualities of a sunset/sunrise are presented on an electronic computing device using a rating scheme that presents one or more numbers, descriptors, or scores to rate the sunrise/sunset. For example, ratings range from "epic" to "decent" to "mostly skunky". Alternatively, a numerical rating scheme is used; for example, with 10/10 or 100% representing the best possible sunset/sunrise conditions, and 0/10 or 0% representing clear blue or overcast grey skies. These numbers, descriptors, or scores are computed by combining two or more of the algorithm's outputs; for example, by subtracting the aforementioned Chance of Skunk from the potential, or by multiplying the two scores together in a meaningful way.

In another embodiment, the data are also simultaneously supplied to one or more real-time report collection and dissemination systems, an example of which can be a chat group, who can review the data in real time, as well as one or more human or computer-based/artificially intelligent forecasters who can review and verify the data for accuracy. Group discussions can allow users to share audiovisual media and chat conversation to verify the accuracy of the data. The forecasters, in turn, monitor the group conversation as well as other relevant real-time weather reports, and can create adjustments to the original data should the forecast data need modification after they have been calculated by the method.

In an alternate embodiment, real-time updates are provided via crowdsourcing. For example, users of a mobile app or website are able to specify the current conditions at a given location, by adding a marker to an interactive map or by submitting a form. These current conditions are incorporated into the algorithm's forecasts, and major updates to specific locations can be pushed to users to whom those updates are relevant.

The disclosure provides a method for assessing an illumination value of a scene or location. The method includes determining the physical and optical characteristics of an atmosphere in a scene/location; determining one or more illumination characteristics of said scene/location from an observer perspective; calculating a fraction of light rays in the scene/location that bounce off of, are absorbed by or illuminate an object along a path between an illumination source and an observer, relative to the total number of light rays in the scene/location that pass between the illumination source and the observer, and using such fraction to provide an illumination value to a user. In one embodiment, the method includes calculating a fraction of light rays in the scene that reach an observer from an illumination source after any colorization resulting from travel through the atmosphere according to atmospheric optics relative to the total number of rays the observer can see.

An interactive map may be produced to display the favorability of conditions over various observer locations throughout a forecast region.

It will be apparent that the methods of the disclosure can be implemented by a computer.

These and other features, aspects, and advantages of the present invention will become better understood with regard to the following descriptions, appended claims and accompanying drawings.

DETAILED DESCRIPTION

Figure 1:
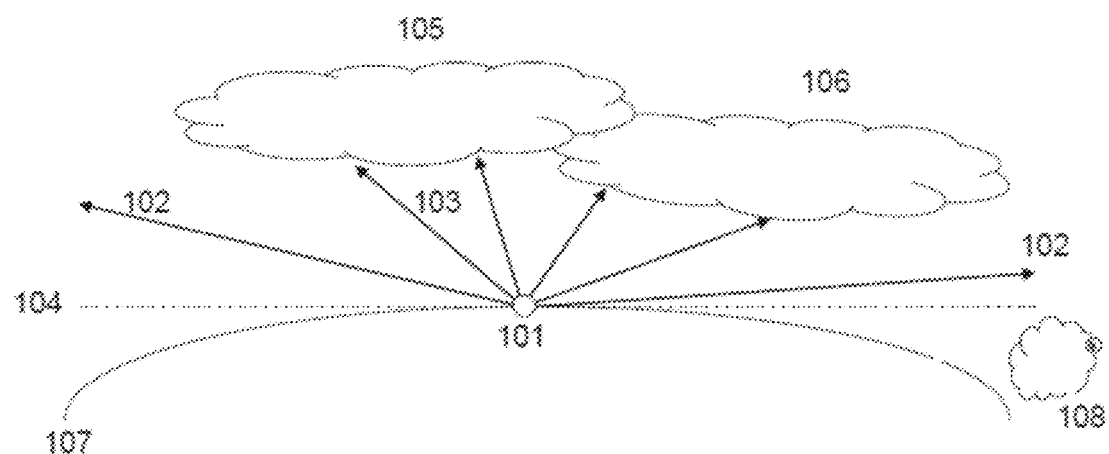
FIG. 1 shows the observer model for determining the presence and positions of clouds relative to an observer, in an embodiment of the invention that assesses the aesthetic qualities of sunsets/sunrises.

As used herein and in the appended claims, the singular forms "a," "and," and "the" include plural referents unless the context clearly dictates otherwise. Thus, for example, reference to "an event" includes a plurality of such events and reference to "the observer" includes reference to one or more observers and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications or web-site information mentioned herein are incorporated herein by reference in full for the purpose of describing and disclosing the methodologies, which are described in the publications, which might be used in connection with the description herein. With respect to any term that is presented in one or more publications that is similar to, or identical with, a term that has been expressly defined in this disclosure, the definition of the term as expressly provided in this disclosure will control in all respects.

The following procedures, and diagrams referenced in the disclosure, depict various embodiments of the invention, which forecasts colorful sunsets. Similar versions of the appended diagrams can be constructed for other cloud and optical phenomena whose qualities relative to an observer are to be assessed; for example, cloud texture, crepuscular rays, or rainbows.

The disclosure provides a method for assessing a scene or location for visual events including, but not limited to, lighting events. The method includes determining the physical and optical characteristics of an atmosphere in a scene/location. The scene/location can be a place an observer is currently standing, or may be a scene/location where an observer is planning to be (e.g., a virtual observer). In some embodiment, the scene/location is suggested to an observer based upon the probability of a visual event or lighting event. A visual event or lighting event refers to visual scene that has desired lighting or the chance of a desired lighting for observation, photography or videography. For example, the lighting event or visual event can be the sunset (e.g., including hues and colors), moonrise and the like.

The method includes determining one or more illumination characteristics of the scene/location from an actual or virtual observer perspective and calculating light rays or a subset thereof in the scene/location that contact or have an effect on an object along a path between an illumination source and the actual or virtual observer, relative to the total number of light rays in the scene/location that pass between the illumination source and the observer. The method then uses that fraction to provide an illumination value to a user or actual observer. Where the actual observer is using a mobile device with GPS, the GPS coordinates can be used to define the scene/location.

As used herein an object in a ray path includes any object that modifies a ray of light such that a ray of light would be blocked, absorbed, bent, reflected, refracted, split or changed. In one embodiment, the object comprises a density of water vapor sufficient to from a visible cloud. In another embodiment, the object comprises a density of water vapor that is more than the density of water vapor for that location/scene on a clear sunlit day. It should be noted that water vapor densities are affected by location, pressure and/or temperature (ocean, coastal, mountain etc.) and thus will vary depending upon the scene/location. One of skill in the art can readily determine the atmospheric water density on a clear day at a particular location/scene (see, also, [[ftp://]]ftp.ngdc.noaa.gov/STP/publications/miscellaneous/afrl_publications/handbook_1985/Chptr16.pdf). In particular embodiments the object is, rain, fog, mist, a visible cloud or a denser body of water or object.

For example, FIG. 1 shows an example of an observer model for determining the presence and positions of visible clouds 105 and 106 to an observer 101. A set of scans 102 and 103 extends from observer 101 within the set of angles defined up to visible boundaries 104 that is defined by terrain boundaries. Terrain and elevation for various locations are readily available from various website and data sources. Scan 103 that collides with clouds 105 and 106 is noted at the point of collision, whereas scan 102 does not collide with clouds, thus does not indicate the presence of the clouds. Due to the domain of visible ray traces, cloud 108 cannot be seen because it is beyond the observer's horizon, as determined by the curvature of the earth 107. In one embodiment, the process can be broken down into two steps. First, a sufficient number of rays are traced from the virtual observer across the visible portion of a virtual observer sphere that does not collide with the terrain. Any ray that does not collide with the terrain will either leave the computational domain or it will collide with a cloud or object. For those points that collide with a cloud, another ray trace is conducted that sweeps the path of the sun around the event time. If those paths leave the computational domain, that cloud is considered to light up, and those that collide with the terrain or another cloud do not light up for that sweep angle.

The ray trace maps the path of the rays in the observer's or virtual observer's domain into the computational domain using $$(i,j,k)=M(o,\theta,\varphi,\rho) \tag{1}$$

where $(o, \theta, \varphi, \rho)$ represents the observer initial location expressed in a convenient coordinate system, elevation, azimuth, and radial distance from the observer, respectively. The paths follow the reverse of the path a ray of light, for example, from the sun that would travel to get to an observer or virtual observer can be modeled by the path function $$p=p^{o/c}+p^{c/s} \tag{2}$$

where the path p is the vector addition of the path from the virtual observer to the cloud, and $p^{o/c}$ to the path from the cloud to the sun $p^{c/s}$, if present. If such a path is found, then that particular path represents an observed cloud that is "lit up". The scan begins, for example, when the sun is at the horizon and continues in small increments until the rays from the visible clouds all collide with terrain, which may also be accounted for in the model. A similar scan is also performed for small increments of angles slightly above the horizon, as intense sunset light is often observed during these times.

The function M in equation (1) is a coordinate transform that converts the observer angles to Earth spherical coordinates, to Earth Cartesian coordinates, and finally into the computational domain. The observer or virtual observer can either represent the human observer on Earth or a cloud in the computational domain.

After a ray trace is performed for each observer, the data of any observed clouds and, from the observed clouds, of any lit up clouds are collected and summarized.

It should be noted that there exist variations on the ray trace method that achieve similar results. For example, what is described above is an exemplary embodiment for a sunset "burn" ray trace; for those skilled in the art, the method is easily adapted to trace light in situations where crepuscular rays, rainbows, or other phenomena of interest may occur.

Figure 2:
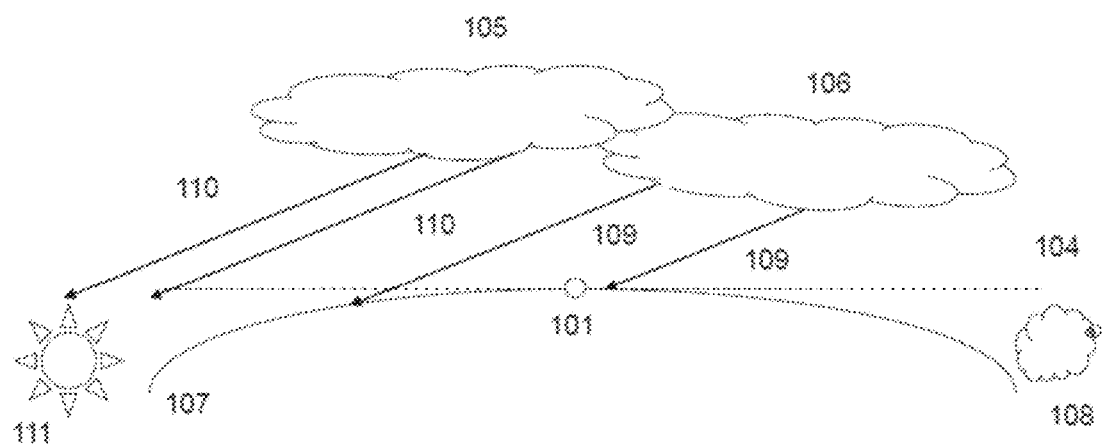
FIG. 2 shows a scan used to determine whether a particular cloud mass will light up at sunrise/sunset, in an embodiment of the invention that assesses the aesthetic qualities of sunsets/sunrises.

FIG. 2 shows the scan used to determine if clouds 105 and 106 will light up at sunrise/sunset. Rays 109 and 110 are traced in the direction of the sun 111. Ray 110 is capable of reaching the sun, thus being indicative of a ray that can "light" a cloud; while ray 109 is blocked by the earth terrain 107 and does not light up.

Figure 3:
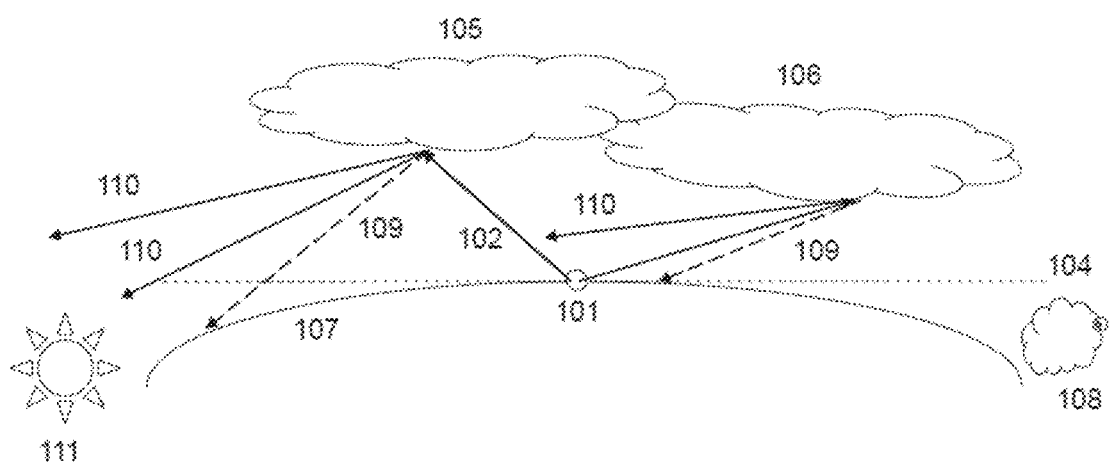
FIG. 3 shows a scan that simulates the motion of the sun to determine the time the cloud mass points light up, in an embodiment of the invention that assesses the aesthetic qualities of sunsets/sunrises.

FIG. 3 shows a scan that simulates the motion of the sun 111 to determine the range of solar angles at which clouds 105 and 106 light up. Rays 110 are capable of reaching the sun 111 and thus are rays that can light clouds 105 and 106; while rays 109 are blocked by the earth terrain 107 and thus do not identify rays that light up clouds.

Figure 4A:
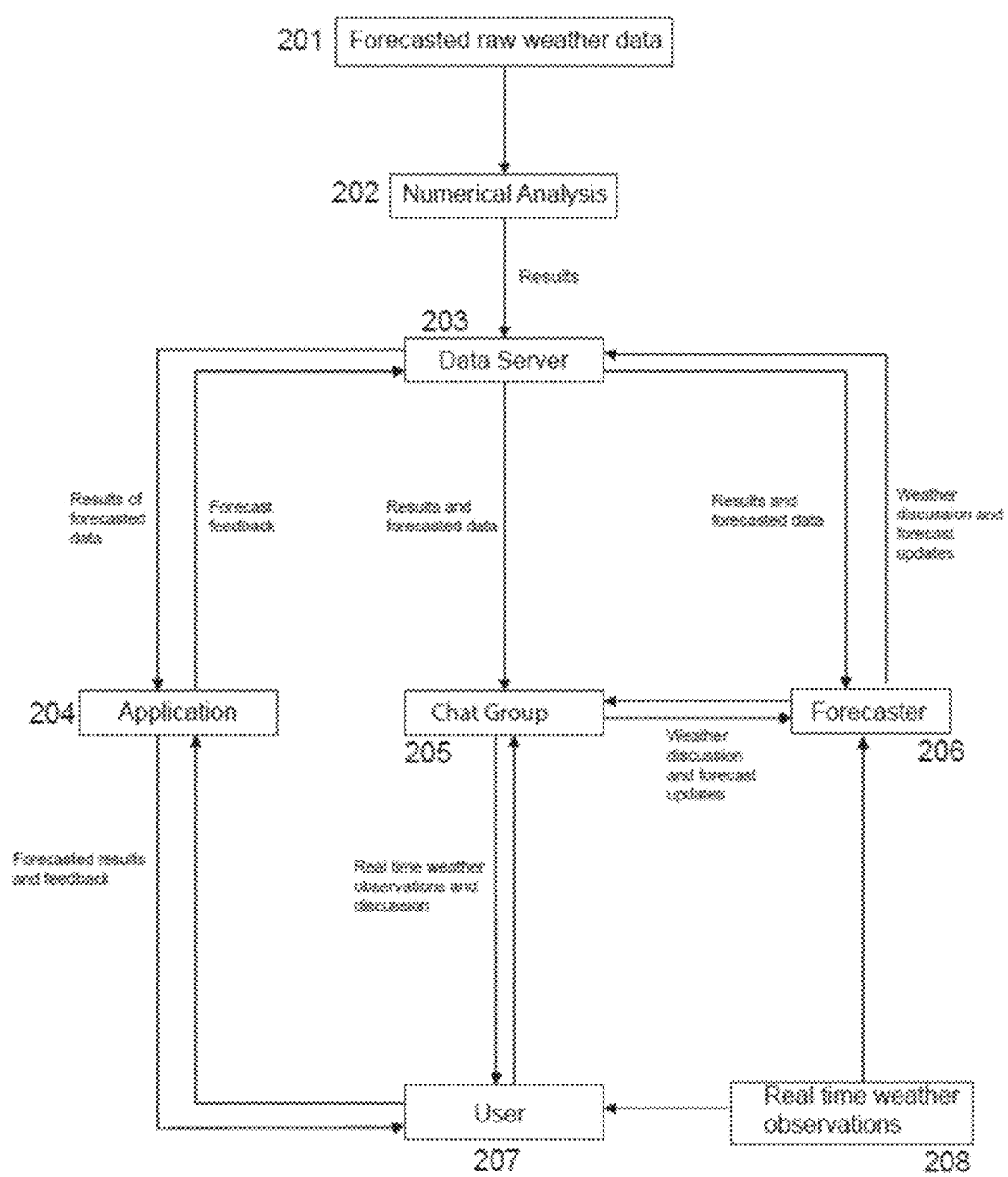
FIG. 4A-G show sample process flowchart of the methods of the disclosure. (A) shows a high-level overview of a method of the disclosure. (B-G) shows a more detailed overview of the method of the disclosure.

FIG. 4A shows a high-level process flowchart of a sample scene/location meteorology forecasting service of the disclosure. Specifically this figure shows how the data get processed and delivered to the user. In one embodiment, the forecasted raw data 201 are imported, and calculated through the algorithm and analysis 202. The results from the analysis are then pushed through a data server 203, and the data are then pushed to electronic computing devices (in this example, a mobile application, e.g., on a smart phone, tablet or other device) 204, real-time reports collection and dissemination system (in this example, a chat group) 205, and the Forecaster(s) 206. A user 207 can then access both their electronic computing device 204 and real-time report collection and dissemination system 205, and submit feedback on the data through either means. The real-time reports collection and dissemination system 205, in this example, comprises a social media network of users who can discuss and track the results live, with some users who happen to be in the geographical area of the forecast taking picture or videos to be shared with other users in the group. The one or more forecasters 206, which may be human or computer-based/artificially intelligent, monitor the weather discussions and forecast updates, as well as real time weather observations 208. Should an updated forecast be necessary, the Forecaster(s) can manually modify the forecast results.

Figure 4B:
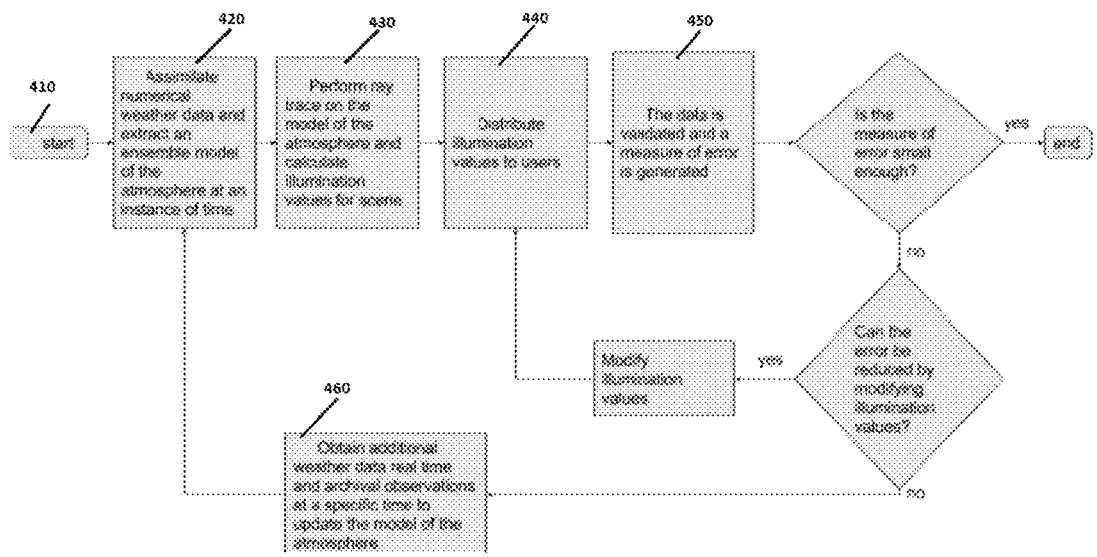

FIG. 4B provides a further description of the methods of the disclosure related to methods 202-208 of FIG. 4A. For example, a further routine of 202 from FIG. 4A can include 420 (see, FIG. 4B), wherein numerical data is extracted from the raw weather data model(s) of the atmosphere at a specific time or time-frame. There are numerous ways to do this including, but not limited to: obtaining variables to form a numerical weather prediction (NWP) into a data structure, extracting satellite imagery into a data structure, and/or use real-time weather images and reconstruct the state of the clouds through 3D reconstruction and geolocation. Typically variables from a NWP are obtained in an initial step. Once the initial modeling of the atmosphere is performed at 420, ray trace information is obtained at 430 to provide illumination values for a scene/location using the ensemble model of the atmosphere. The processing at 430 can include a number of steps and variations of each step. In one embodiment, the method includes performing a ray trace, either through a structured or unstructured grid, about the location of the observer or virtual observer with enough rays to get a sufficiently good sampling of what the observer or virtual observer can/would see. The ray trace can be a scan along a path that radiates from the observer or virtual observer through the atmosphere. Along the way, the path can be straight or curved according to the laws of atmospheric optics. The effects of absorption, transmission, opacity, refraction, diffraction, and the like can be incorporated using the appropriate equations and modeled using appropriate variables. The ray paths continue until some light source is reached, or until they leave the atmosphere. Additional traces may be performed if a reflective cell is encountered. The cell becomes a secondary observer or secondary virtual observer and again the ray traces are performed as above. The number of additional traces may be limited to some arbitrary number in the interest of computational time. After all the ray paths are performed, metrics such as whether or not it reaches a light source, the number of rays reaching a light source, and the like, are processed into a figure of merit and/or a summary relevant to that particular scene/location. The figures of merit and/or summary can then be distributed to users 440. The distributed figures and/or summary can be validated by a user 450. For example, the users can validate the model input (raw NWP weather data, raw weather model results and/or derived weather data from step 420) against the results, observed in real-time and archival weather data, and predicted data based on the observed real time and archival weather data. This step can also be done numerically. If discrepancies are found between the raw model input and either the results, observed real time and archived weather data, or predicted weather data based on observed weather data, a correction step is taken depending on the situation to improve the results. For example, if the observed weather differs from the model input, the model input can be updated to better match the observed information, and the analysis is run again to yield updated results 460. If the results don't make sense, the results can be overridden, or modifications to the algorithm can be performed based on a statistical analysis/evaluation. The method comprising 420-460 can be repeated until some combination of the measure of error between the input and data derived from the observed data are sufficiently small and the confidence in the results is sufficiently high.

Figure 4C:
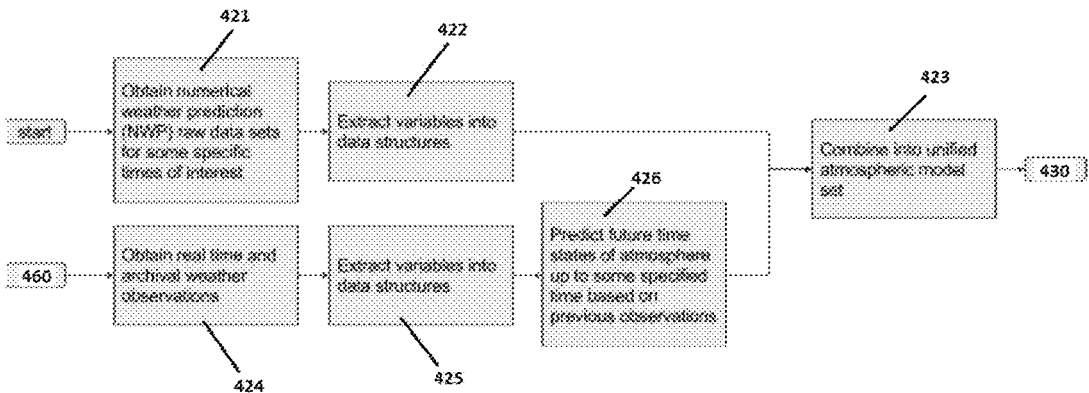

FIG. 4C provides additional detail regarding the processing at box 420 of FIG. 4B. Within, for example, the subroutine of 420, numerical weather prediction (NWP) raw data sets for specific times/dates of interest are obtained 421. Variables in the raw data are extracted into a data structure 422, which are combined into a unified atmospheric model set 423. Optionally, real-time and archival weather observations can be obtained 424, extracted into a data structure 425 and used for further prediction modeling 426. The atmospheric model set 423 is then used for ray analysis (see, 430).

Figure 4D:
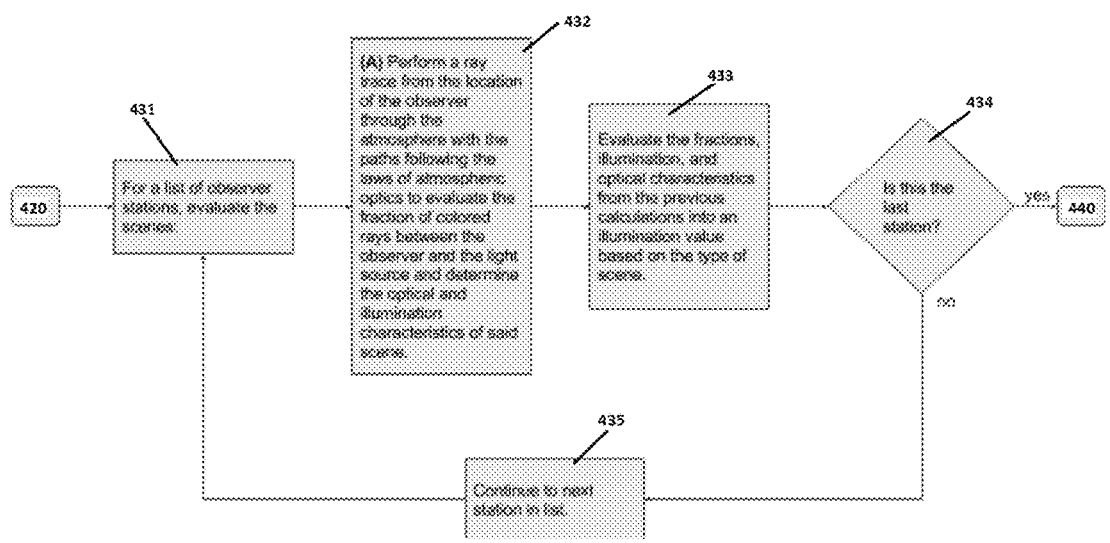

FIG. 4D provides additional detail regarding the processing at box 430 of FIG. 4B. Within, for example, the subroutine of 430, the atmospheric model set 423 is matched to an observer station 431. Using the atmospheric model set, a ray trace is then performed for the observer location/scene through the atmosphere with the paths following the laws of atmospheric optics to evaluate the fraction of colored rays between the observer and the light source and determining the optical and illumination characteristics of the scene 432. The fraction of colored rays and optical characteristics from 432 are then used to provide an illumination value for the scene/location 433. If this is the last observer location/scene then the information is output to the users 434/440. If this is not the last location/scene, steps 431-433 are repeated 435.

Figure 4E:
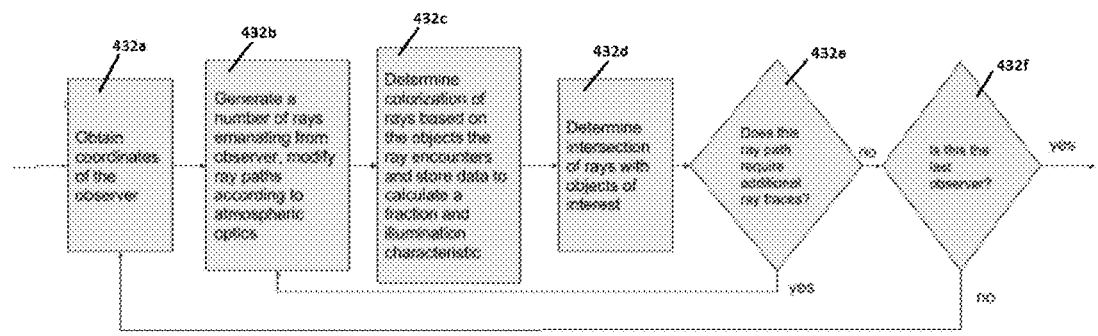

FIG. 4E provides additional detail regarding the processing at box 432 of FIG. 4D. Within, for example, the subroutine of 432, coordinates of an observer are obtained 432a (e.g., by GPS location). A plurality of rays are then defined to emanate from the observer's location towards a light source 432b taking into account the atmospheric model of 423. Colorization of the rays is then calculated based upon the objects (e.g., clouds) encountered in the ray-path as well as the fraction of ray contact with the object thus providing an illumination characteristic 432c and 432d. The process then reviews whether additional ray traces are necessary to provide a satisfactory illumination value to a user 432e. If additional ray traces are required steps 432b-432e are repeated. If no additional ray-traces are required for the scene/location, the process repeats (as necessary) for any additional scene/location 432f.

Figure 4F:
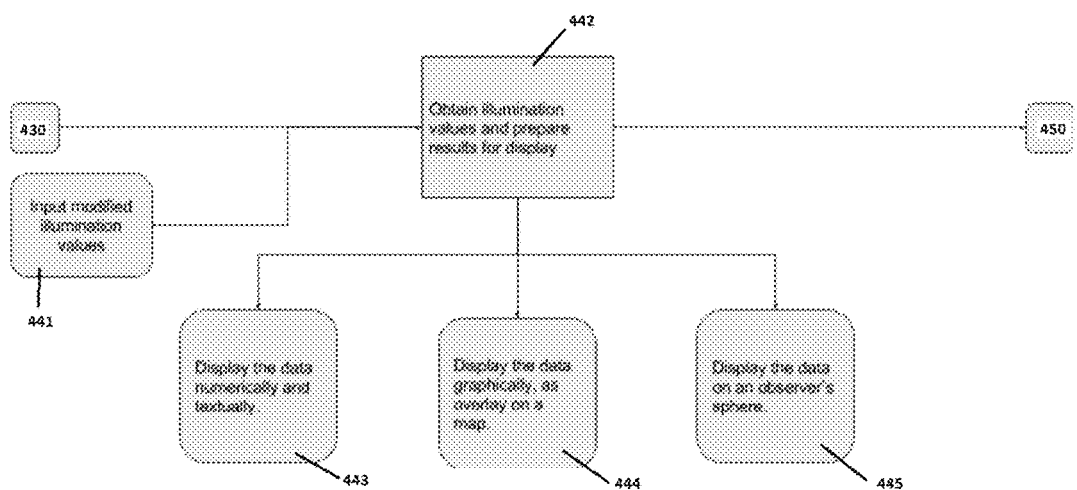

FIG. 4F provides additional detail regarding the processing at box 440 of FIG. 4B. Within, for example, the subroutine of 440, the illumination values can be provided to a user. Depending upon the illumination values obtained in the process of the disclosure, the error of the values can be modified. The modified values are provided into the process at 440 via 441. At 442, the illumination values are provided for display on, e.g., a user's mobile device. The data (e.g., the illumination values) can be displayed to a user by municipal and textual form 443, as a graphic or overlay 444 and/or as a display on an observer sphere 445.

Figure 4G:
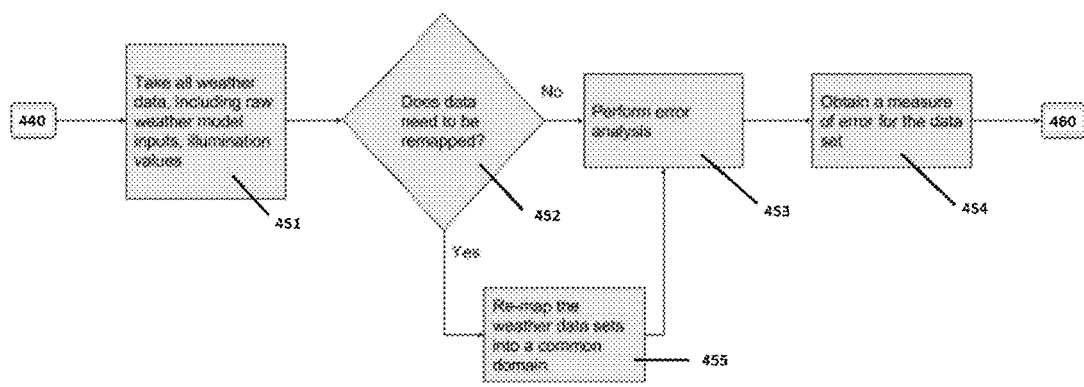

FIG. 4G provides a subroutine that can be incorporated into 450 of FIG. 4B. For example, at 451 raw weather data including new weather data and illumination values are obtained to determine accuracy (i.e., within error) 452. If the data do not need to be reanalyzed or mapped, the process reviews the possible error 453-454. These results are then used at 460 (see, FIG. 4B). If new weather data require remapping 452, then the data are remapped with the new data 455.

Figure 5:
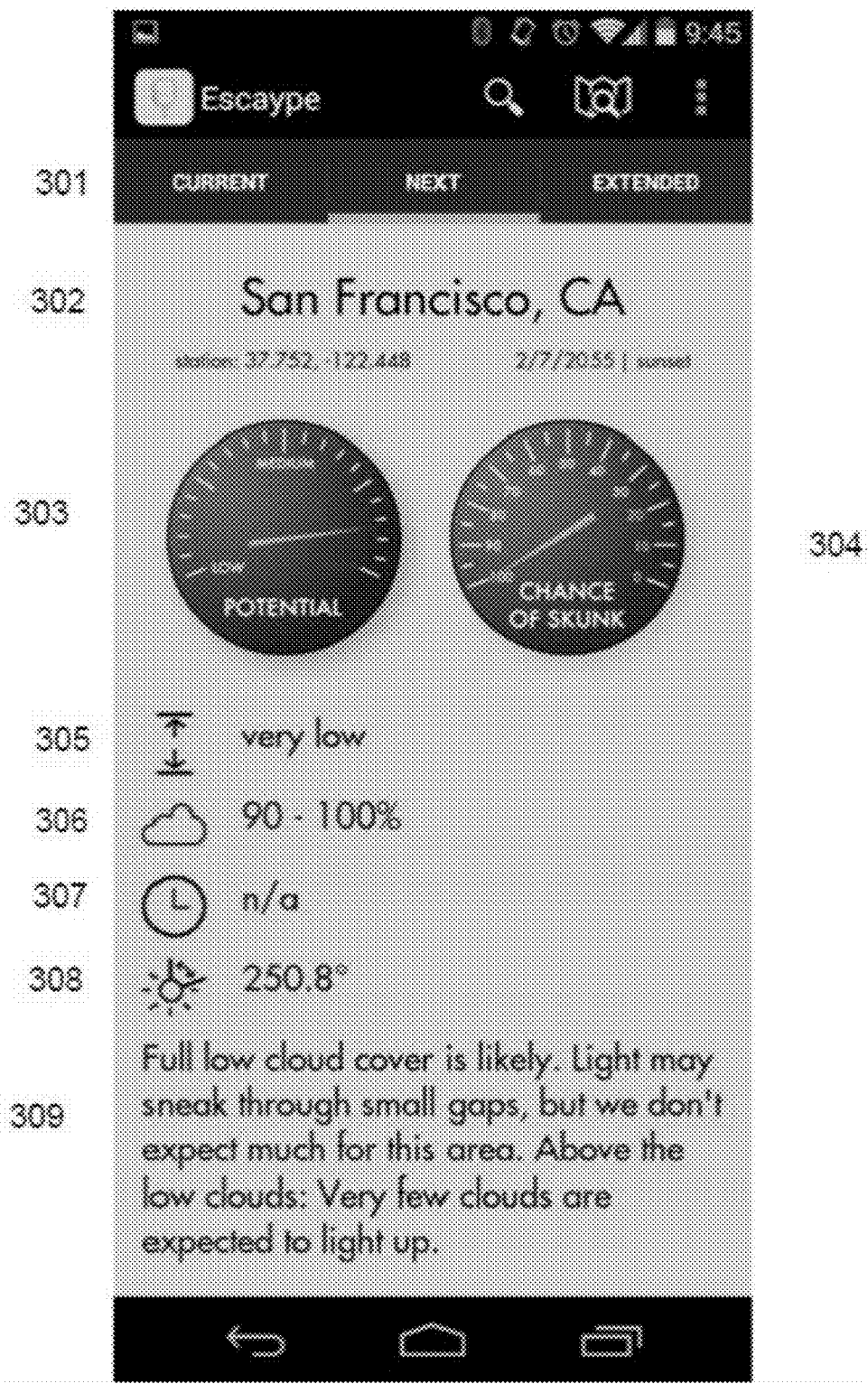
FIG. 5 shows a screenshot of an embodiment of the user interface in a mobile application, in an embodiment of the invention that assesses the aesthetic qualities of sunsets/sunrises.

FIG. 5 shows a screenshot of a possible embodiment of a representation of the forecast results on a mobile device application. Users can see both the potential 303 and illumination value (in this example, Chance of Skunk) 304 in the same screen, and additional information further explaining the two scores are provided below the meters.

In a sample mobile application embodiment, the action bar 301 allows user to directly interact with the data. In this sample embodiment, users can search for locations using a text entry search bar, or search using a map. If the phone location data are available, the user can also search using the phone's current location data (GPS) to find the nearest forecast data relative to the user's location data.

The action bar also includes tabs of current, next, and extended forecasts. The current tab shows forecast data for the next relevant time period (in this example, a golden hour event), where the relevant time period is defined as the time window where the desired cloud, light, and/or optical conditions are forecasted. Going back to the "current" tab, if the golden hour is before or near sunrise, the event will be for sunrise. After that particular day's sunrise, it will soon be updated to the same day's sunset, and so on. The "next" tab is valid for the relevant time period following the "current" one. The "extended" tab is valid for the relevant time period following the "next" one.

For example, a user checks the app at noon. "Current" displays the forecast for tonight's sunset, "Next" displays tomorrow's sunrise, and "Extended" displays tomorrow's sunset. Analogously, for a rainbow forecasting app, "Current" might display the forecast for probability of viewing a rainbow from the observer's location for the current day, "Next" would be the following day, and "Extended" would be the following day.

The location and date 302 of the forecast data are provided to identify which location the forecast data applies to. In the preferred embodiment, the location and date contains at least (1) city name and state or province where the city is located, (2) station coordinates, which displays the location of the model observer point nearest the location entered, and (3) event time and date, which tells the user the date for the forecast, as well as whether the forecast is for sunrise or sunset. It should be noted that other common type of information, including but not limited to last updated time, list of nearby locations, and a link to an embedded map, can be also included along with the location data listed above.

The forecast data comprises the potential rating 303 and the illumination value 304, and both elements, in conjunction with any other ratings presented, are used to determine the forecasted quality of an event.

Following the ratings 303 and 304, this embodiment also discloses other relevant information to the user. The cloud height icon 305 tells the user how high the clouds are expected to be.

The cover icon 306 tells the user how much of the sky is expected to be covered, measured in a percentage range. The best time icon 307 tells the user the estimated time of the peak of the event; in this case, when the most intense colors will be present. The solar azimuth and event time icon 308 tells the angle at which the sun will rise or set, measured clockwise from the north. This icon can be very useful for planning purposes, as the most intense colors are often found at or near this angle. The description section 309 provides a qualitative synopsis of the expected outcome from the perspective of the observer.

Figure 6:
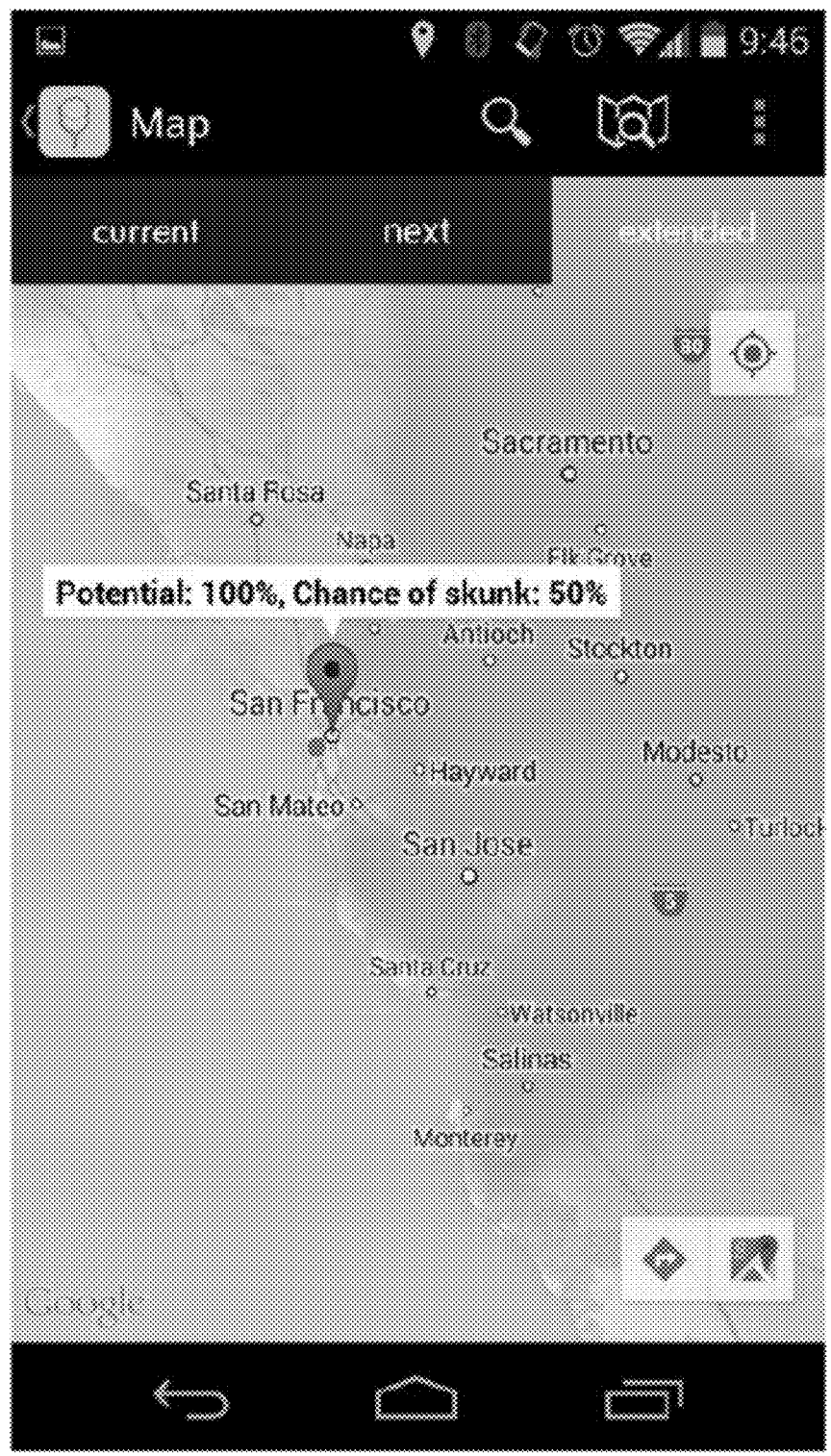
FIG. 6 shows a screenshot of an embodiment of a map display along with the prediction rating as seen by a user, in an embodiment of the invention that assesses the aesthetic qualities of sunsets/sunrises.

FIG. 6 shows a possible embodiment of a map search function within a mobile application for the user. A user can view the location's name, date, and a map layered with a representation of one or more of the aesthetic ratings of the scene, on the map using a color scheme to show the various range of probabilities of the forecast.

Figure 7:
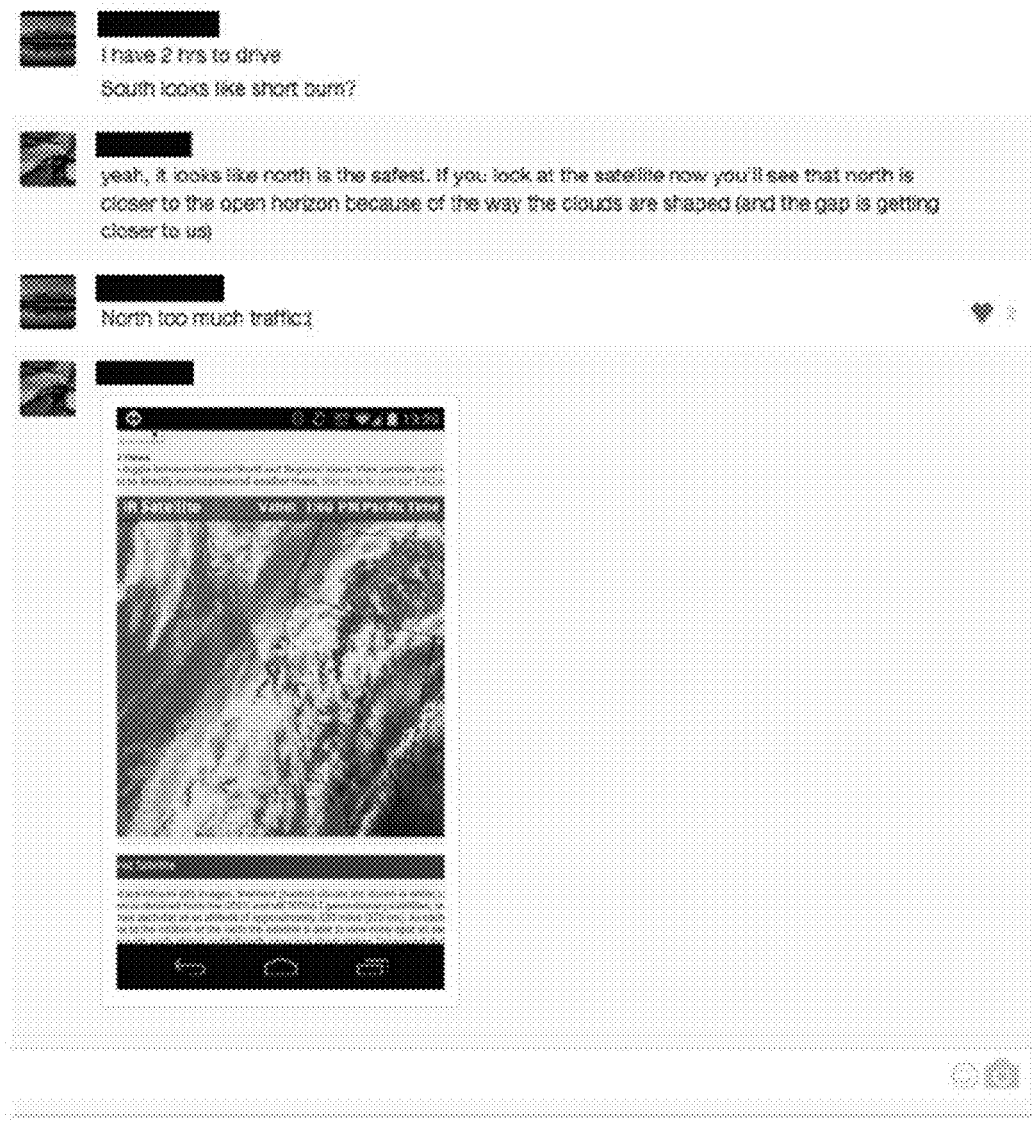
FIGS. 7-9 show screenshots of an embodiment of a social media discussion of a plurality of users discussing the results of the forecast data.
Figure 8:
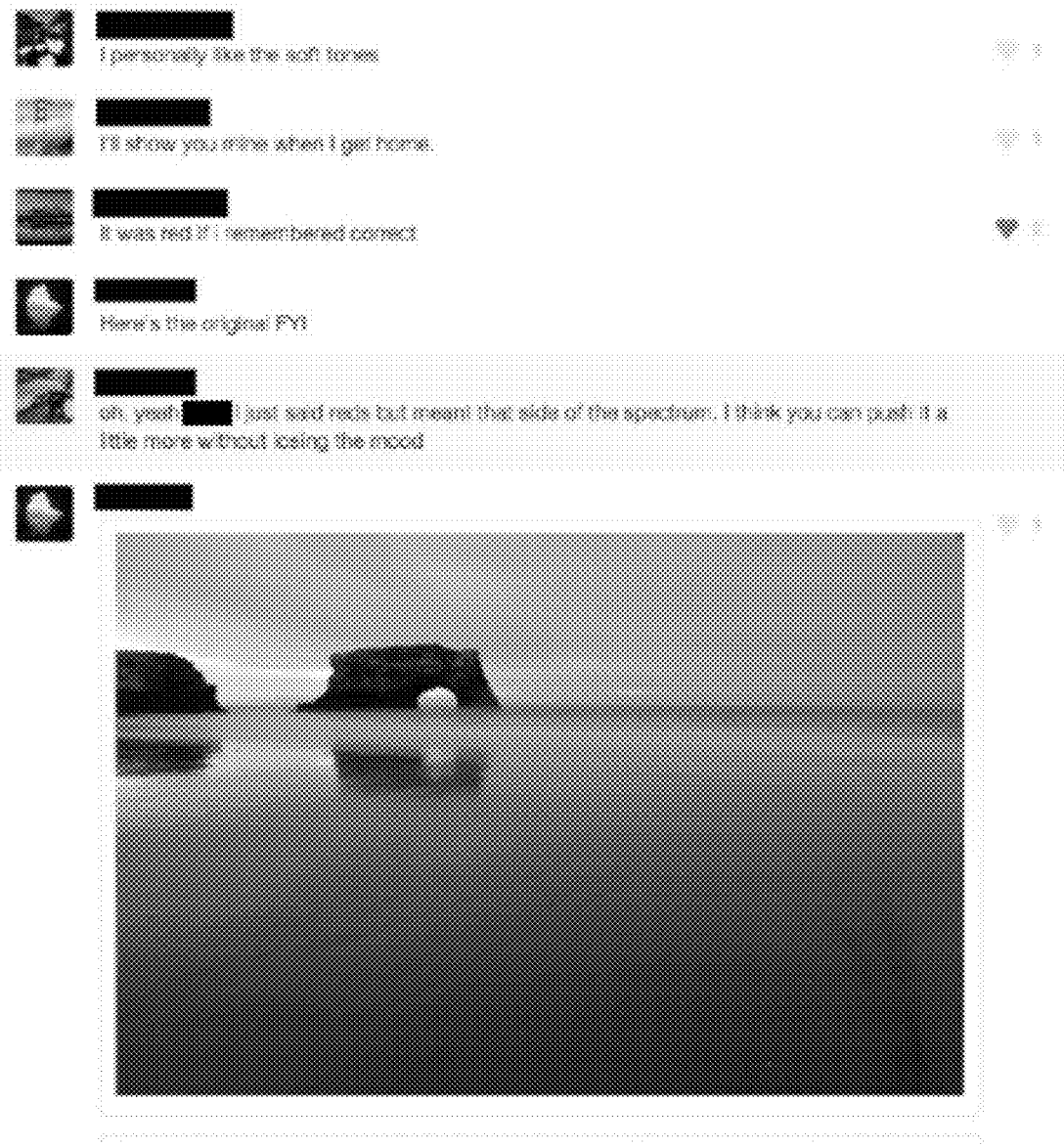
Figure 9:

FIGS. 7, 8, and 9 show a possible embodiment of the real-time reports collection and dissemination system (in this case, a social media group) combining discussion of the results of the machine calculated data with real-time observations and other live weather forecast outlets. Users can take pictures of the sky and/or write descriptions to report conditions, and the results are immediately shared with other users to verify the accuracy of the data results.

Examples of natural light sources include the sun and the moon; examples of non-natural sources include on and off-camera flashes and spotlights.

Variables that can describe or affect the state of the atmosphere include pressure, visibility, absolute vorticity, geopotential height, relative humidity, specific humidity, temperature, dew point temperature, wind velocity, precipitation, convective available potential energy, convective inhibition, precipitable water, downward short-wave radiation flux, storm relative helicity, storm motion velocity, parcel lifted index, convective available potential energy, convective inhibition, turbulent kinetic energy, cloud mixing ration, cloud ice, altitude, soil temperature above ground, volumetric soil moisture content, soil temperature validation to deprecate, moisture availability, water equivalent of accumulated snow depth, non-convective large scale precipitation storm surface runoff, baseflow-groundwater runoff, latent heat net flux, sensible heat net flux, ground heat flux, snow phase change heat flux, evaporation, potential evaporation surface roughness, drag coefficient, momentum flux, sensible heat net flux, latent heat net flux, exchange coefficient, vegetation, cloud cover percentage, upward or downward long-wave radiation flux, upward or downward short-wave radiation flux, brightness temperature, stream function, Blackadars mixing length scale, frictional velocity, rain mixing ratio, snow mixing ratio, probability of frozen precipitation, precipitation rate, total condensate, RIME factor, snow depth, maximum snow albedo, liquid volumetric soil moisture, snow-free albedo, number of soil layers in root zone, canopy conductance, minimal stomatal resistance, wilding point, transpiration stress-onset, direct evaporation cease, soil porosity, solar parameter in canopy conductance, temperature parameter in canopy conductance, humidity parameter in canopy conductance, soil moisture parameter in canopy conductance, wind shear, horizontal moisture divergence; total column integrated cloud cover, cloud ice, rain, snow, supercooled liquid water, melting ice, and condensate; reflectivity, composite reflectivity, solar radiative heating rate, long-wave condensate heating rate, large scale condensate heating rate, Haines index, updraft helicity, and vertically integrated liquid.

The light source can be either natural or artificial light. Natural light sources include the sun, moon, stars, planets, atmospheric entry phenomena, lightning, aurorae, wild fires, reflections, bioluminescence, chemiluminescence, and radioluminescence. Artificial light sources include city lights, electric light producing devices, electroluminescence, electrochemiluminescence, wildfires, electric discharge devices, incandescent devices, explosives, fireworks, mechanoluminescence, radioluminescence.

Factors that affect the illumination characteristics of a scene include atmospheric variables and composition, terrain, bodies of water, light intensity, observer location, cloud position, and atmospheric optical effects.

The numerical rating values can be represented by one or more of the following: potential, skunk/failure, intensity, direction lit cloud fraction, unlit cloud fraction, a positive predictive value, a negative predictive value, or a receiver operating characteristic.

The weather data can include raw input from various models and systems, including, but not limited to, different numerical weather prediction models and satellites such as
1. global numerical weather prediction models, such as IFS, ECMWF, FIM, GEM, GFS, NAVGEM, UM, JMA, GME, ARPEGE;
2. regional and mesoscale numerical weather prediction models, such as HRRR, NAM, RR, RAP, RAMS, WRF, FAQMS, HIRLAM, LAPS, RPM;
3. chemical transport models, such as CLaMS, MOZART, and GEOS-Chem;
4. atmospheric dispersion models, such as ADMS, AERMOD, ATSTEP, AUSTAL2000, ALPUFF, DISPERSION21, ISC3, MEMO, MERURE, NAME, OSPM, PUFF-PLUME, RIMPUFF, and SAFE AIR;
5. weather satellites, such as CBERS, COSMO-SkyMEd, DMSP, DMC, EROS, Fengyun-3, FORMOSAT-2, GOSAT, Landsat, MetOp, Meteor, POES, RADARSAT-2, SMOS, SPOT, TerraSAR-X, THEOS, Sentinel series, Aqua, Aura, CALIPSO, CloudSat, GCOM-W1 (Shizuku), OCO-2, GPM, TRMM, QuikSCAT, Terra, ACRIMSAT, NMP-EO-1, Jason series, Meteor 3M-1/Sage III, GRACE, Aqua, Sorce, Aura, CALPISO, NPOESS, Megha-Tripoques, SARAL, IRS, ESSP, Aquarius, Landsat series, SMAP, MTSAT
6. geostationary weather satellites, such as Electro-L, Fengyun-2, GOES, INSAT, Meteosat, Himawari-8;
7. weather reports, including photographic images, text data, video, nowcasts; and
8. data derived from any one or all of these sources.

Methods to refine the forecast can include comparing the weather model forecast at some specific time prior to the instant of the scene to real-time weather data, such as from satellites and weather reports, integrating the differences into a derived weather and cloud model, and predicting the future states of the atmosphere based on captured states of the atmosphere.

The ray paths can include the effects of atmospheric optical effects including absorption, dispersal, diffraction, polarization, reflection, refraction, or scattering due to terrain, bodies of water, atmospheric composition, haze, humidity, atmospheric contaminants, or atmospheric variables.

The scenes can include meteorological phenomena such as afterglow, airglow, Alexander's band, alpenglow, anticrepuscular rays, anthelion, aurora, belt of Venus, circumzenithal arc, cloud iridescence, crepuscular rays, Earth's shadow, glory, green flash, halos, heiligenschein, light pillar, mirages, the Novaya Zemlya effect, rainbows, cloud burns, haze, cloud color, or sky color.

Methods for data visualization or graphs can include displaying the ratings on a map with a graded colored overlay, forming a heatmap. Data visualization can also include displaying the ratings on an observer's sphere, produced by overlaying the ratings as a graded colored overlay on to a panoramic virtual reality view that represents what an observer would see at some location on Earth. The ratings can also be displayed numerically or with graphics that represent the numerical value.

The methods and systems described herein can be implemented by one or more computers or computer systems. A computer system may be understood as a logical apparatus that can read instructions from media and/or a network port, which can optionally be connected to server having fixed media. The system can include a CPU, disk drives, optional input devices such as keyboard and/or mouse and optional monitor. Data communication can be achieved through the indicated communication medium to a server at a local or a remote location. The communication medium can include any means of transmitting and/or receiving data. For example, the communication medium can be a network connection, a wireless connection or an internet connection. Such a connection can provide for communication over the World Wide Web. It is envisioned that data relating to the present disclosure can be transmitted over such networks or connections for reception and/or review by an observed or use using a mobile device (e.g., a smart-phone, tablet or other remote computer device).

The computer system can include a processor for processing instructions. Non-limiting examples of processors include: Intel Xeon™ processor, AMD Opteron™ processor, Samsung 32-bit RISC ARM 1176JZ(F)-S v1.0™ processor, ARM Cortex-A8 Samsung S5PC100™ processor, ARM Cortex-A8 Apple A4™ processor, Marvell PXA 930™ processor, or a functionally-equivalent processor. Multiple threads of execution can be used for parallel processing. In some embodiments, multiple processors or processors with multiple cores can also be used, whether in a single computer system, in a cluster, or distributed across systems over a network comprising a plurality of computers, cell phones, and/or personal data assistant devices.

A high speed cache can be connected to, or incorporated in, the processor to provide a high speed memory for instructions or data that have been recently, or are frequently, used by processor. The processor is connected by a bridge to a processor bus. The bridge is connected to random access memory (RAM) by a memory bus and manages access to the RAM by the processor. The bridge can be connected to a second bridge by a chipset bus. The first or second bridge is, in turn, connected to a peripheral bus. The peripheral bus can be, for example, PCI, PCI-X, PCI Express, or other peripheral bus. The bridge(s) are sometimes referred to as a processor chipset and manage data transfer between the processor, RAM, and peripheral components on the peripheral bus. In some alternative architectures, the functionality of the bridge can be incorporated into the processor instead of using a separate bridge chip.

In some embodiments, the system can include an accelerator card attached to the peripheral bus. The accelerator can include field programmable gate arrays (FPGAs) or other hardware for accelerating certain processing. For example, an accelerator can be used for adaptive data restructuring or to evaluate algebraic expressions used in extended set processing.

Software and data are stored in external storage and can be loaded into RAM and/or cache for use by the processor. The system includes an operating system for managing system resources; non-limiting examples of operating systems include: Linux, Windows™, MACOS™, BlackBerry OS™, iOS™, and other functionally-equivalent operating systems, as well as application software running on top of the operating system for managing data storage and optimization in accordance with example embodiments of the present disclosure.

The system can also include network interface cards (NICs) connected to the peripheral bus for providing network interfaces to external storage, such as Network Attached Storage (NAS) and other computer systems that can be used for distributed parallel processing.

A network with a plurality of computer systems, a plurality of mobile devices (e.g., phones and personal data assistants), and Network Attached Storage (NAS) is contemplated.

In some example embodiments, processors can maintain separate memory spaces and transmit data through network interfaces, back plane or other connectors for parallel processing by other processors. In other embodiments, some or all of the processors can use a shared virtual address memory space.

The above computer architectures and systems are examples only, and a wide variety of other computer, cell phone, and personal data assistant architectures and systems can be used in connection with example embodiments, including systems using any combination of general processors, co-processors, FPGAs and other programmable logic devices, system on chips (SOCs), application specific integrated circuits (ASICs), and other processing and logic elements. In some embodiments, all or part of the computer system can be implemented in software or hardware. Any variety of data storage media can be used in connection with example embodiments, including random access memory, hard drives, flash memory, tape drives, disk arrays, Network Attached Storage (NAS) and other local or distributed data storage devices and systems.

In example embodiments, the computer system can be implemented using software modules executing on any of the above or other computer architectures and systems. In other embodiments, the functions of the system can be implemented partially or completely in firmware, programmable logic devices such as field programmable gate arrays (FPGAs), system on chips (SOCs), application specific integrated circuits (ASICs), or other processing and logic elements. For example, the Set Processor and Optimizer can be implemented with hardware acceleration through the use of a hardware accelerator card.

It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Although the invention has been described in considerable detail with reference to certain preferred versions thereof, other versions are possible. Therefore, the spirit and scope of the appended claims should not be limited to the description of the preferred version contained herein.

What is claimed is:

1. A computer implemented method for assessing an illumination value of a scene/location comprising executing on a processor the steps of:
   (i) obtaining over a network, wireless or internet connection numerical weather prediction (NWP) raw data sets and storing the NWP raw data sets on a non-transitory computer storage device;
   (ii) extracting data structures from the NWP raw data, and generating a model of the atmosphere at one or more instances of time at the scene/location from the data structures;
   (iii) obtaining over a network, wireless or internet connection terrain, geographical and/or weather data of the scene/location and determining the physical and optical characteristics of an atmosphere in the scene/location at the one or more instances of time;
   (iv) determining one or more illumination characteristics of the scene/location from an observer perspective taking into account the physical and optical characteristics of the atmosphere in the scene/location;
   (v) performing a ray trace of the scene/location from the observer perspective on the model of the atmosphere and calculating a fraction of light rays in the scene/location that bounce off of, are absorbed by or illuminate an object along a path between an illumination source and an observer, relative to the total number of light rays in the scene/location that pass between the illumination source and the observer; and
   (vi) making an illumination value available to a user's device over a network, wireless or internet connection.

2. The method of claim 1, wherein for step (v), the object is atmospheric vapor, or a cloud.

3. The method of claim 1, wherein for step (v), the illumination source is an artificial light or a natural light.

4. The method of claim 3, wherein the natural light is selected from the sun, moon and wildfire.

5. The method of claim 1, wherein for step (iii), the weather data includes data selected from the group consisting of a position and height of clouds, a wind velocity, an atmospheric composition, and any combination thereof.

6. The method of claim 1, wherein for step (iii), the weather data comprises a weather model forecast at a specific time and wherein the weather model forecast is compared to actual weather data at the specific time.

7. The method of claim 6, wherein the comparison of the weather model forecast to actual weather data is used to identify differences between the forecast and actual weather data and further use those differences to improve the physical and optical characteristics of an atmosphere in a scene/location.

8. The method of claim 1, wherein for step (v), the light ray paths account for absorption, dispersal, diffraction, polarization, reflection, refraction, radiation, transmittance or scattering due to terrain or bodies of water, atmospheric composition, haze, humidity, atmospheric contaminants, and/or atmospheric variables.

9. The method of claim 1, wherein for step (iii), the physical and optical characteristics of an atmosphere in a scene/location include afterglow, airglow, Alexander's band, alpenglow, anti-crepuscular rays, anthelion, aurora, belt of Venus, circumzenithal arc, cloud iridescence, crepuscular rays, Earth's shadow, glory, green flash, halos, heiligenschein, light pillar, mirages, the Novaya Zemlya effect, rainbows, cloud burns, haze, cloud color, or sky color.

10. The method of claim 3 wherein the artificial light sources are selected from the group consisting of city lights, electric light producing devices, and fire.

11. The method of claim 1, wherein for step (vi), the illumination value for the scene/location is further optimized based on revised weather forecast results and feedback from users to improve the physical and optical characteristics of an atmosphere in a scene/location.

12. The method of claim 1, wherein for step (vi), the illumination value comprises one or more values that include a percent for potential skunk/failure, lit cloud fraction, unlit cloud fraction, a positive predictive value, a negative predictive value, a receiver operating characteristic, intensity, color, duration, height, direction, time, confidence, or a combination of ratings.

13. The method of claim 1, wherein for step (vi), the illumination value is outputted to the user's device as (i) data visualizations, (ii) graphically as a digitized map with a graded colored overlay, and/or (iii) on an observer's sphere with a graded color overlay wherein the intensity of the color correlates to the value of the rating at a designated observer location.

14. The method of claim 1, wherein step (i) further comprises obtaining real time and archival weather observation data; and step (ii) further comprises extracting data structures from the real time and archival weather observation data,
wherein, the model of the atmosphere in step (ii) is revised to take into account any differences in real time and observation data versus the NWP data.

15. The method of claim 1, wherein the one or more instances of time and the scene/location are specified by the user.

16. The method of claim 1, wherein for step (iv), the observer's perspective includes the GPS location and altitude of the observer, along with the angle between and the observer and the light sources at the one or more instances of time at the scene/location.

17. The method of claim 1, wherein for step (v), the ray tracing trace maps the path of the rays in the observer's or virtual observer's domain into the computational domain using the equation:

$$(i,j,k)=M(O,\theta,\varphi,\rho)$$

wherein (O, $\theta$, $\varphi$, $\rho$) represents the observer initial location expressed in a convenient coordinate system, elevation, azimuth, and radial distance from the observer, respectively, and function M is a coordinate transform that converts the observer angles to Earth spherical coordinates, to Earth Cartesian coordinates, and finally into the computational domain.

18. The method of claim 17, wherein the path of the rays follows the reverse of the path of a ray of light by emanating from the observer, and continue until a light source is reached or until they leave the atmosphere.

19. The method of claim 17, wherein an additional ray tracing is performed where a path of a ray encounters a reflective cell, wherein the reflective cell is treated as a secondary observer.

20. The method of claim 1, wherein for step (vi), the illumination value is transmitted to a mobile phone app on the user's device.

* * * * *